Sept. 18, 1945.  F. S. CARLILE  2,385,127
BATTERY JAR
Filed Oct. 21, 1944

INVENTOR
FRANK S. CARLILE
BY
Barr, Borden & Fox
ATTORNEYS

Patented Sept. 18, 1945

2,385,127

UNITED STATES PATENT OFFICE 2,385,127

BATTERY JAR

Frank S. Carlile, Abington, Pa., assignor to Carlile & Doughty, Incorporated, Conshohocken, Pa., a corporation of Pennsylvania Application October 21, 1944, Serial No. 559,748

8 Claims. (Cl. 136—166)

The present invention relates to storage batteries and more particularly to the jars for containing the cells.

In jars as heretofore constructed the sides thereof are formed of plane surfaces and hence when two or more jars are placed side by side these surfaces assume abutting contact surfaces. In such constructions the tops of the jars are sealed with a suitable compound which also covers and seals the joint between adjacent jars. While this construction does not prevent proper charging of the battery, it does introduce a serious time factor which limits production. This factor is due to the heat developed by the charging current whereby the rate of charging must be relatively low to prevent damage. In the absence of heating, the charging rate can be high and the number of batteries charged in a given time be doubled or trebled as compared to present day charging operations.

Some of the objects of the present invention are: to provide an improved battery jar; to provide a battery jar wherein heat developed during charging is large dissipated; to provide a battery jar which can be charged at a relatively high rate without developing a temperature sufficient to cause damage; to provide a battery jar which not only reduces the cost of manufacture of the battery but results in an appreciable increase in quantity production in a given time; to provide a battery jar assembly wherein provision is made for circulating cool air about the jars during charging; and to provide other improvements as will hereinafter appear.

Figure 1:
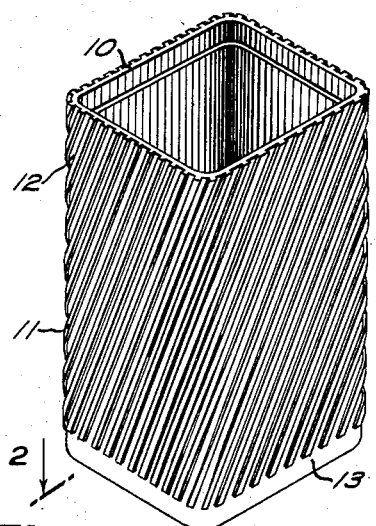
Figure 2:
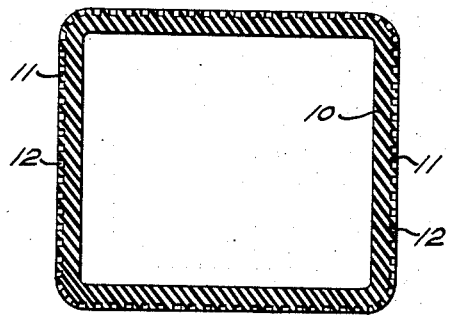
Figure 3:
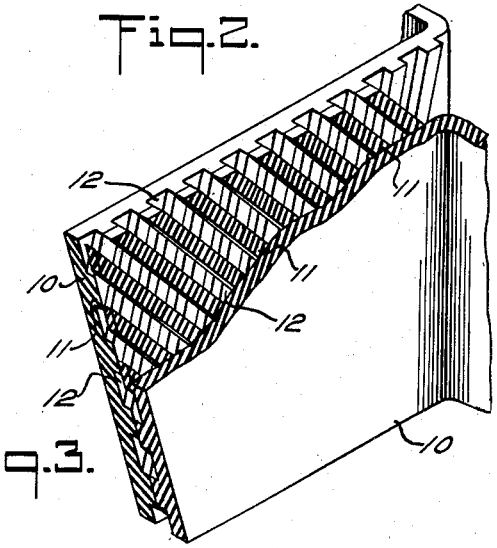
Figures 4, 5:
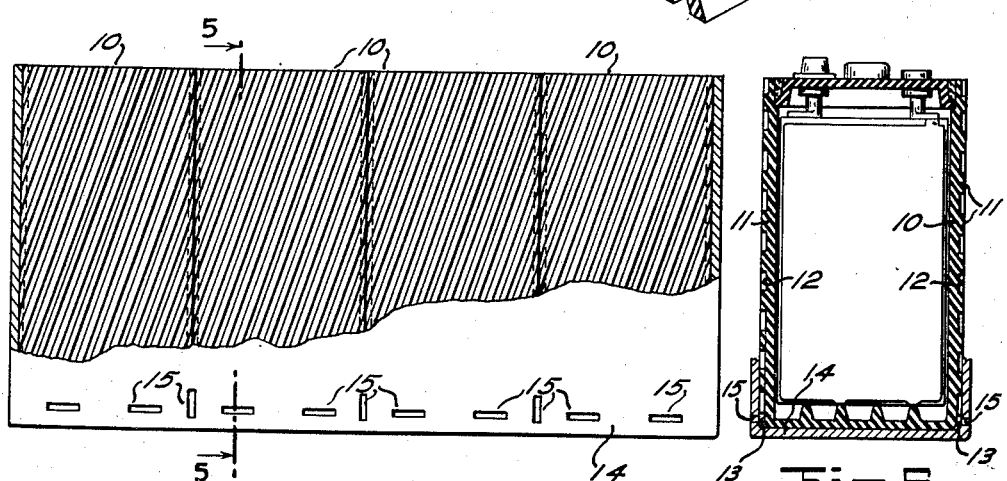

In the accompanying drawing, Fig. 1 represents a perspective of a battery jar embodying one form of the present invention; Fig. 2 represents a section on line 2—2 of Fig. 1; Fig. 3 represents an enlarged fragmentary portion of two abutting jar sides showing the rib relation; Fig. 4 represents a side elevation of a four jar battery showing the outside case broken away; and Fig. 5 represents a section on line 5—5 of Fig. 4.

Referring to the drawing, one form of the present invention is shown as applied to a battery jar 10 of conventional rectangular shape and molded of rubber composition, or other insulating and acid resisting material, for receiving the plates and electrolyte which form the cell of the battery.

For providing means to cool the sides of the jar 10, each side is provided with ribs 11 arranged in parallel spaced relation and extending from a common horizontal plane spaced from the bottom of the jar 10 to the top thereof. As shown, the ribs 11 are angularly disposed to the vertical and therefore a portion of those on each side overlap onto an adjacent side but continue thereon to the top edge of the jar. Thus, a plurality of channels 12 are formed about the four sides of the jar, such channels being respectively open at the top and bottom. Since the lower ends of the ribs 11 terminate short of the bottom of the jar 10, there is a continuous space 13 around the jar which is in communication with all of the channels 12 and thus directs air thereto to circulate upwardly, sweeping the sides of the jar, absorbing heat and maintaining a relatively low temperature.

In order to admit air to the space 13, or to the several spaces 13 where a number of jars 10 are assembled side by side as shown in Fig. 4, the case or wooden or steel tray 14 in which the jars 10 are assembled, is provided with elongated ports or passages 15 through the case in horizontal alinement with the spaces 13. As shown, those passages 15, which open laterally into the spaces 13, are elongated horizontally, while those passages 15, which open into the ends of the spaces 13 at the joint between two jars 10, are elongated vertically. The particular shape, however, of the passages is not limited to that shown since the essential requirement is that passages capable of admitting sufficient air be provided.

It should be noted, as the ribs 10 are arranged substantially on a diagonal, that when two faces or sides of two jars are brought together the meeting ribs cross one another in lattice formation and thereby form two sets of channels, since the channels of neither jar side are obstructed by contact of the two sets of ribs.

It will now be apparent that a complete unitary battery jar has been devised wherein exterior air passages are provided and arranged to form a natural circulation of air about the sides of the jar whereby overheating is prevented during charging of the battery and the time of charging is very materially reduced.

Having thus described my invention, I claim:

1. As a new article of manufacture a battery jar having exterior parallel ribs arranged at an angle to the vertical to form a plurality of independent channels to circulate air, said ribs terminating at one end substantially in the plane of the top of said jar, and spaced at the other end from the bottom of said jar to leave an unribbed space communicating with said channels.

2. The combination of a battery jar and parallel upwardly disposed ribs angularly inclined to the vertical and attached to the jar sides forming channels for air, said ribs terminating in spaced relation to the bottom of said jar to form a transverse space communicating with said channels.

3. The combination of a battery jar and upwardly angularly disposed parallel ribs attached to the sides thereof forming channels for air, said ribs terminating in spaced relation to the bottom of said jar to form a transverse space communicating with said channels, and a tray for said jar having ports communicating with said transverse space.

4. The combination of two battery jars arranged in side to side abutting relation, and inclined ribs on one of said abutting sides, the lower ends thereof being spaced from the bottom of said jar to form upwardly disposed parallel channels between said sides rising from a space free from ribs to cause a circulation of air across the opposed side faces.

5. The combination of two battery jars arranged in side to side abutting relation, and two sets of ribs respectively on said sides arranged in opposite inclined relation to provide when placed in abutting relation two sets of upwardly relatively angularly disposed channels to cause a two directional circulation of air across the opposed side faces.

6. The combination of a plurality of battery jars, and parallel spaced ribs on all sides of each bar and disposed at an angle to the vertical, the arrangement being such that pairs of abutting sides of adjacent jars form a lattice rib effect providing two sets of upwardly arranged channels, said ribs terminating short of the lower end of each side to form a transverse space extending around all sides of each jar.

7. The combination of a plurality of battery jars, and parallel spaced ribs on all sides of each jar and disposed at an angle to the vertical, the arrangement being such that pairs of abutting sides of adjacent jars form a lattice rib effect providing two sets of upwardly arranged channels, said ribs terminating short of the lower end of each side to form a transverse space extending around all sides of each jar, and a tray for said jars having ports therethrough to communicate with the respective transverse spaces.

8. The combination of a plurality of battery jars, and parallel spaced ribs on all sides of each jar and disposed at an angle to the vertical, the arrangement being such that pairs of abutting sides of adjacent jars form a lattice rib effect providing two sets of upwardly arranged channels, said ribs terminating short of the lower end of each side to form a transverse space extending around all sides of each jar, and a tray for said jars having ports therethrough to communicate with the respective transverse spaces, certain of said ports being juxtaposed to the space along the side of the jar and the remaining ports being juxtaposed to the space at the joint between two jars.

FRANK S. CARLILE.